G. ATTERBURY.
APPARATUS FOR MOLDING OR CASTING.
APPLICATION FILED MAR. 22, 1911.
1,047,142.
Patented Dec. 17, 1912.
5 SHEETS—SHEET 4.
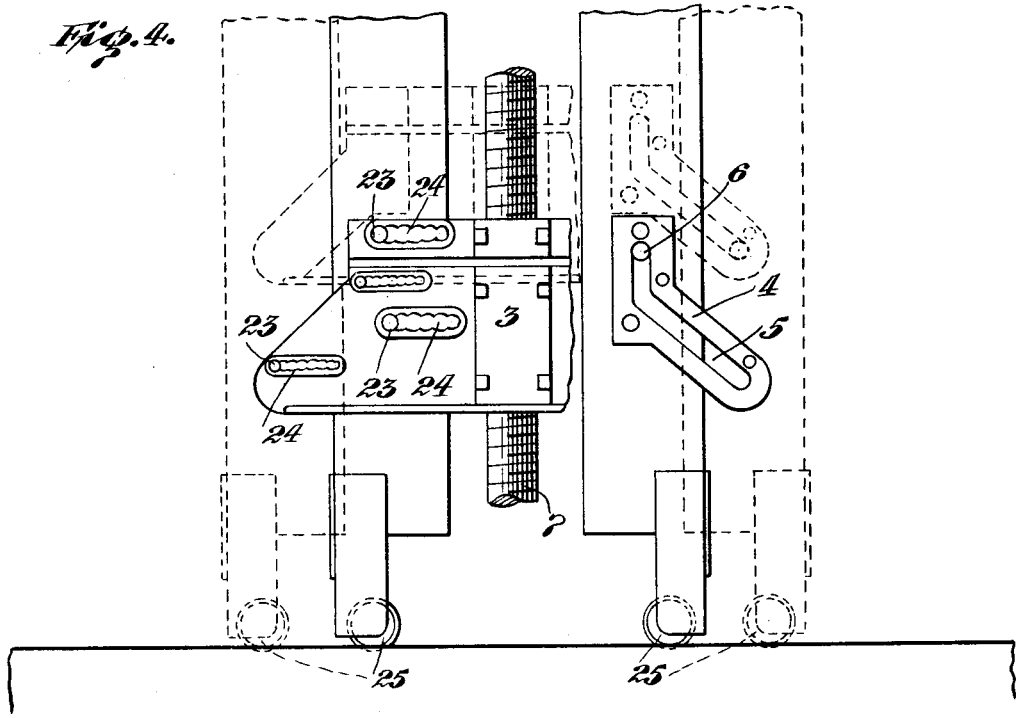
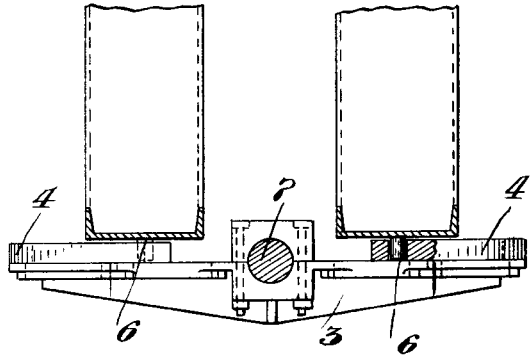
Witnesses:
Inventor
Grosvenor Atterbury
By his Attorneys G. ATTERBURY.
APPARATUS FOR MOLDING OR CASTING.
APPLICATION FILED MAR. 22, 1911.
1,047,142.
Patented Dec. 17, 1912.
5 SHEETS—SHEET 5.
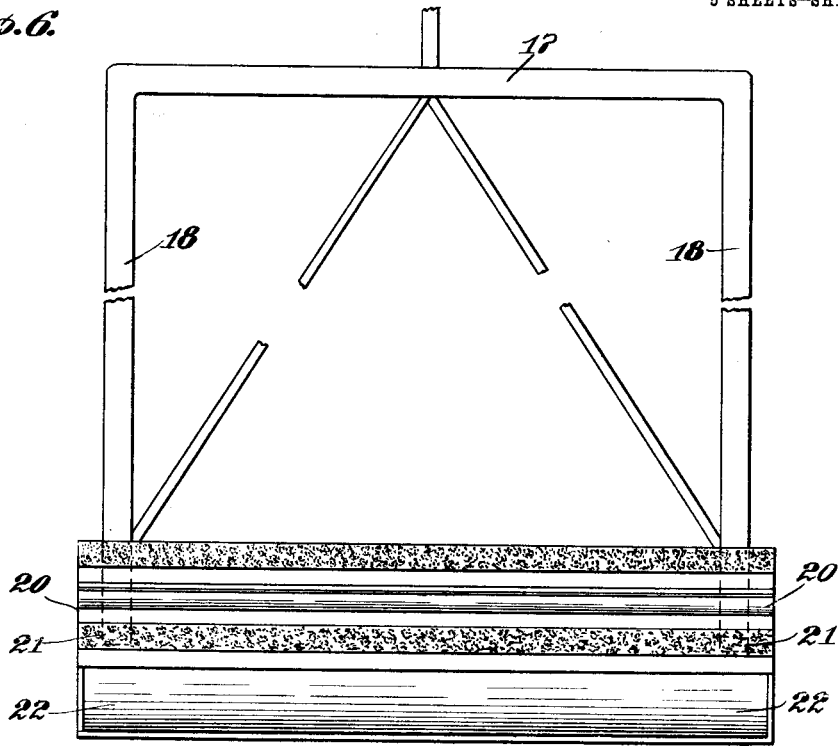
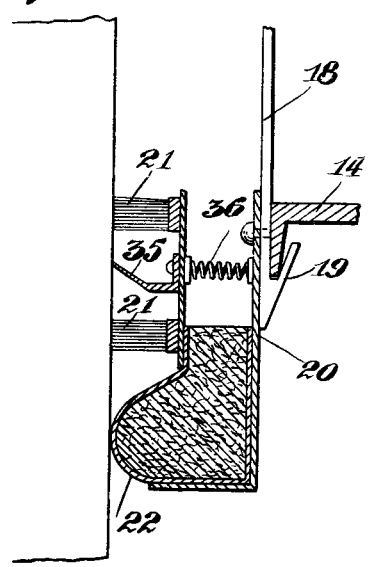
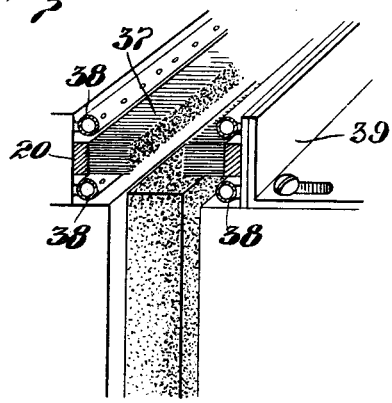
Witnesses:
C. S. Ashley
John W. Peters
Inventor
Grosvenor Atterbury
By his Attorneys

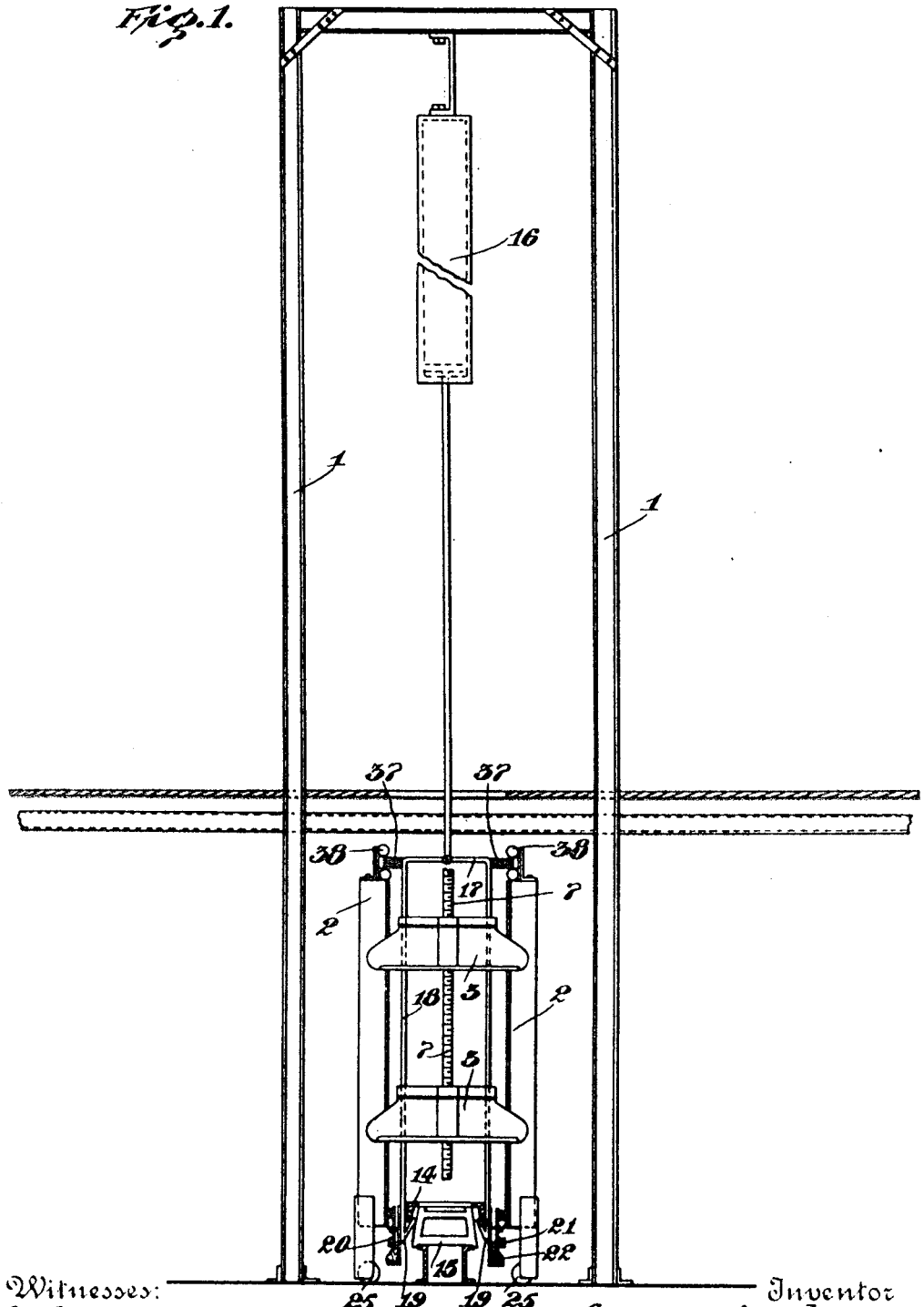

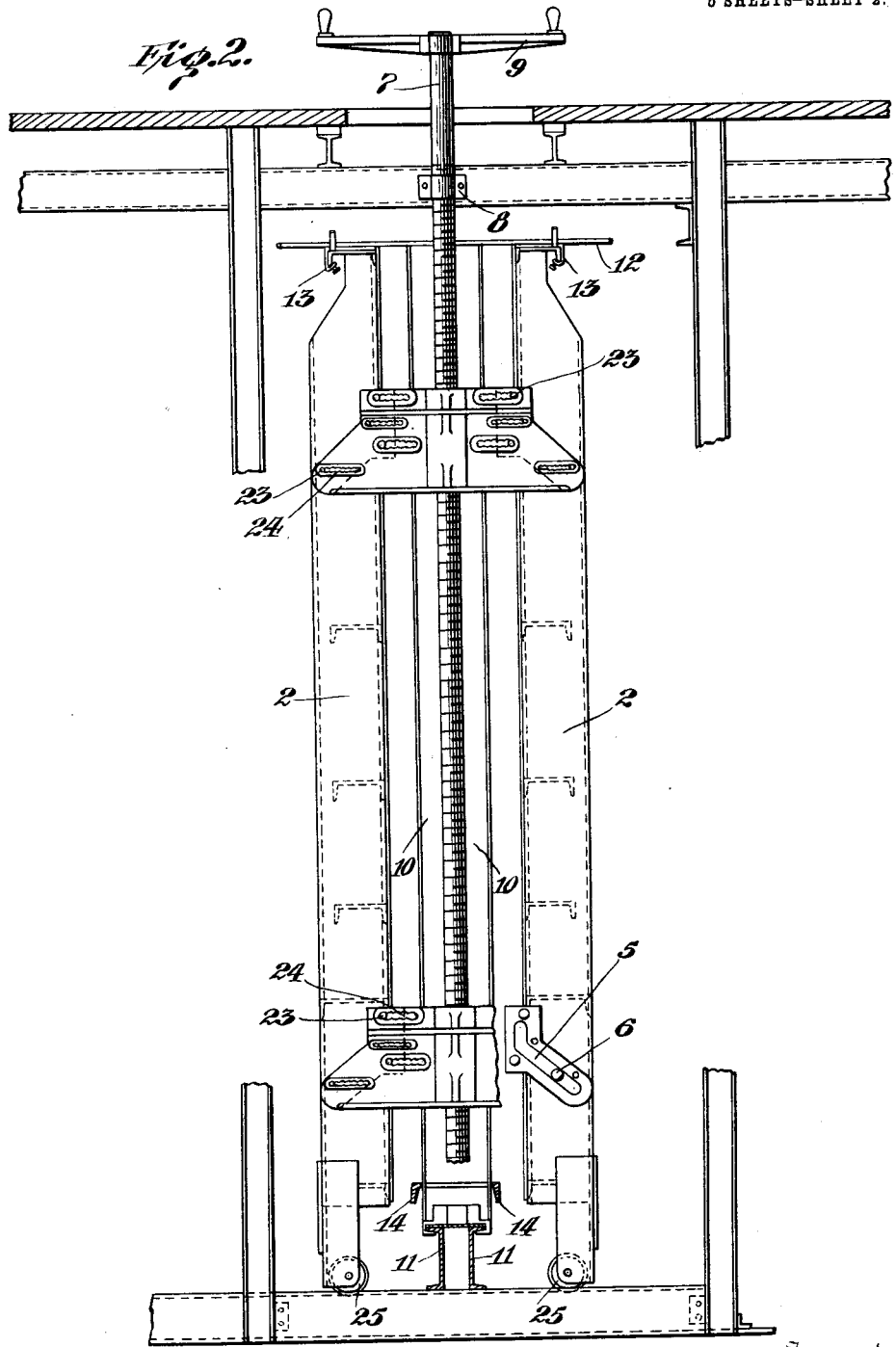

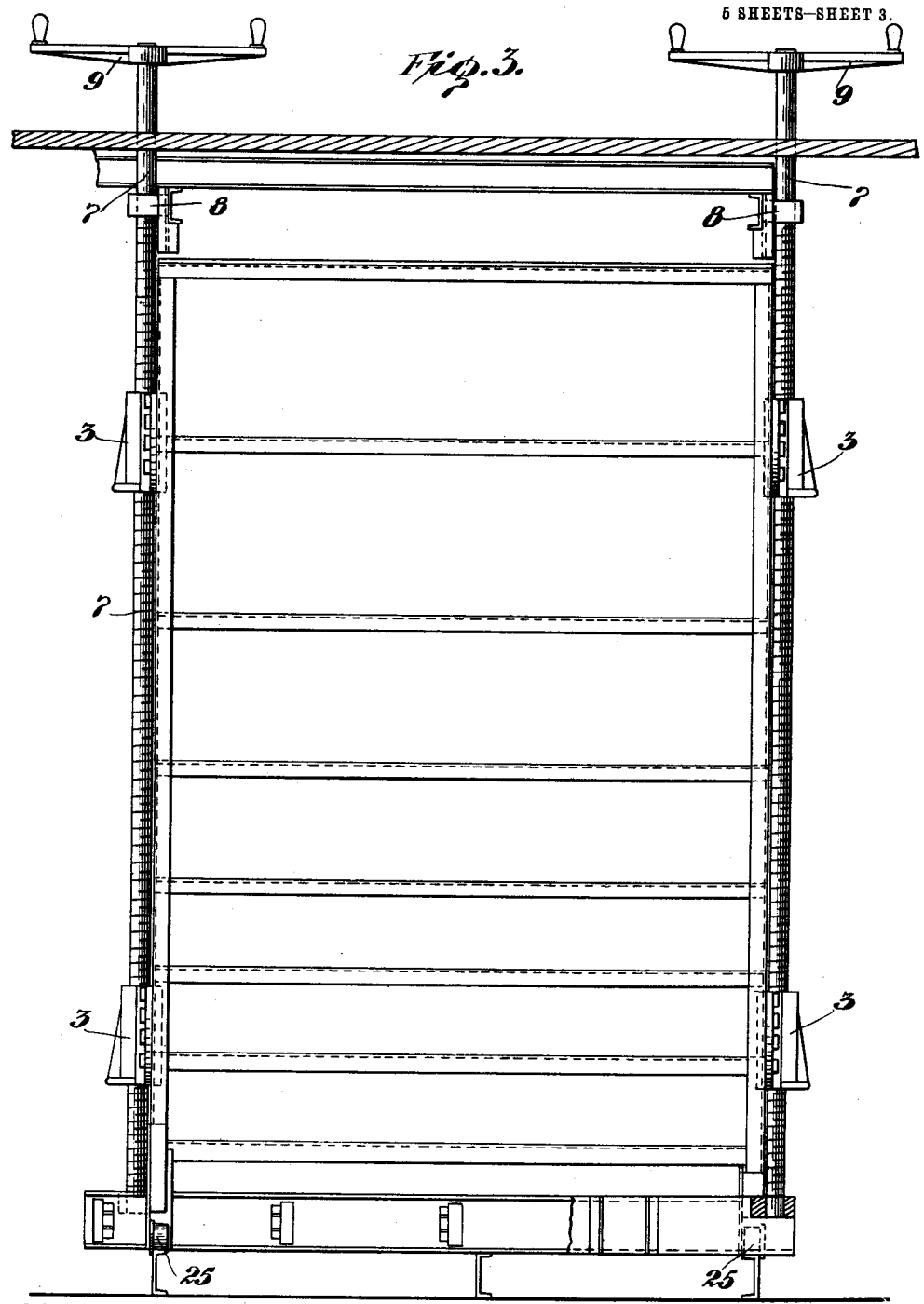

UNITED STATES PATENT OFFICE.

GROSVENOR ATTERBURY, OF NEW YORK, N. Y.

APPARATUS FOR MOLDING OR CASTING.

1,047,142.  Specification of Letters Patent.  Patented Dec. 17, 1912.

Application filed March 22, 1911. Serial No. 616,101.

*To all whom it may concern:*

Be it known that I, GROSVENOR ATTERBURY, a citizen of the United States, and a resident of the borough of Manhattan, city, county, and State of New York, have invented certain new and useful Improvements in Apparatus for Molding or Casting, of which the following is a specification.

My invention relates to apparatus for molding or casting concrete or cementitious blocks or sections adapted for use in building houses or other structures, and particularly relates to apparatus for casting blocks of large dimensions.

One object of my invention is to construct an apparatus for casting concrete and cementitious blocks which can be easily operated with a small amount of labor, and which will be strong, durable and easily adjusted for blocks of different dimensions.

A further object of my invention is to so arrange and combine the apparatus and its component elements that the removal of one block, the cleaning and preparation of the mold to receive another block, and the cleaning or part cleaning and dressing of the faces of the block may be done at one operation, thereby largely avoiding the delay and work heretofore necessary where these operations were done separately.

A further object of my invention is to combine with a casting mold, having sides adapted to open in parallel relation, a lifting device having cleaning members thereon so mounted that when moved into the mold the cleaning members will engage the sides of the mold and guide the lifting device into operative position.

A further object of my invention is to provide simple and strong mechanism for opening the mold and maintaining its sides in the parallel relation necessary for the proper action of the lifting and cleaning device.

Referring to the drawings accompanying and forming a part of this specification, Figure 1 is an end elevation of one embodiment of my improved apparatus, some of the details shown in other views being omitted in order to illustrate the general arrangement of the apparatus. Fig. 2 is an end elevation of the apparatus, the lifting and cleaning device being omitted. Fig. 3 is a side view of the mechanism shown in Fig. 2. Fig. 4 is a detail view of one of the adjustable end members connecting the side walls of the mold. Fig. 5 is a plan view of the structure shown in Fig. 4. Fig. 6 is a detail view of the combined lifting and mold cleaning device. Fig. 7 is a detail view showing a cross section of the mold cleaning device. Fig. 8 is a detail perspective view showing the block cleaning devices secured to the upper edges of the side walls.

Referring in detail to the drawings, the numeral 1 designates a frame, in which the apparatus is assembled. The apparatus comprises a mold having oppositely disposed vertical side walls 2 mounted to move horizontally on the wheels 25 and connected by the vertically adjustable end members 3, of which two are shown at each end of the mold, one near the top and the other near the bottom of the mold. The end members 3 have adjustably secured thereto plates 4, which contain slots 5 to receive the pins 6 fixed on the side walls 2. The slots are inclined for a portion of their length with respect to the side walls so that a vertical movement of the member containing the slots will produce a horizontal movement of the pins and side walls. Near their ends the slots are parallel with the side walls so that when the pins rest in these portions the walls will be effectively locked against strains tending to open them. Screw-threaded shafts 7 are journaled so as to prevent endwise movement to the horizontal members 8, and these shafts are provided with operating handles 9. The threads of these shafts engage the end members 3, and the arrangement is such that when these shafts are rotated the end members will be moved vertically, causing the pins 6 to move in the slots 5 and either open or close the side walls of the mold, due to the movement of the pins 6 in the inclined slots. The parallel portions of the slots, as above described, are so located that when the mold is in closed position the pins 6 will rest in these portions and thus effectively lock the mold in such position. The plates 4 are adjustable independently of the members 3 by varying the position of the bolts 23 in the slots 24. This permits the mold being adjusted to cast blocks of varying thickness.

The mold is provided with end walls 10 (see Fig. 2), which at their lower ends rest on and are secured to the sill 11. At their upper ends these end walls 10 are secured to horizontal members 12, which are slidably secured to the side walls 3 by the brackets 13. The members 12 are curved so that when the side walls are opened the brackets 13 act on the curved ends of these members and force outwardly the upper ends of the end walls. The construction and operation of these members 12 are described in my pending application Serial No. 581,343, and I do not claim this feature in this application.

The mold is provided with a removable bottom 14 which rests on a series of blocks 15 (see Fig. 1), which in turn rest on the sill 11. The block is formed on this removable bottom 14, between the side walls 2 and the end walls 10.

Located over the mold and in line with the opening between its walls there is located a lifting motor 16, which may be of any suitable construction. The device illustrated is intended to operate as a hydraulic lift. A lifting device 17 is connected to the lower end of the lifting motor 16, and comprises depending side members 18 having hooks 19 at their lower ends. Horizontal cleaning and guiding devices 20 are secured on the opposite sides of the lifting device to the members 18. The lifting device is so mounted that the members 20 will move in contact with the inner walls of the mold when the lifting device is raised or lowered. These members 20 are each formed preferably of a straight edge 35, stiff brushes 21 and a fibrous wiper 22. The brushes are intended and adapted to remove any large lumps or fragments of material adhering loosely to the wall and the straight edge is intended to remove those firmly adhering while the wiper is intended to supplement the action of the brush and straight edge and wipe and clean the wall of all small loose particles. It may also be used to oil the surface of the wall where this is desirable.

The brushes 21 and straight edge 35 are held in operative position by the spring 36. This spring is also useful in that it causes the hooks 19 to yield so as to pass beneath the bottom 14, when they are lowered and to engage the bottom when they are raised.

After blocks made of concrete have been formed, it is frequently necessary or desirable to clean or finish their faces before the material forming them has completely hardened. This is sometimes done by brushing their surface so as to give a rough appearance or so as to uncover the small particles which lie near the surface. This cleaning or finishing is also sometimes done by directing a stream of water against the face of the block. These cleaning operations have heretofore been done after the block has been removed from the mold by hand and have caused considerable expense and delay. In order to obviate such expense and delay, I have incorporated cleaning devices in my mold adapted to clean the opposite faces of the block as it is raised. These cleaning devices consist of brushes 37 and sprinkler pipes 38 arranged along the top of the opposite mold walls. These sprinkler pipes and brushes are supported by adjustable brackets 39 (see Fig. 8). The arrangement is such that as the block is raised the brushes 37 will engage its opposite faces and clean and finish them, which operation may be supplemented by streams of water from the sprinkler pipes, or the brushes and sprinkler pipes may be used independently, depending on the style of finish desired.

The operation of the apparatus is as follows: The cleaning and lifting device being raised and the walls of the mold being in closed position, with the removable bottom 14 in position, the material to form the block is placed in the mold and is allowed to set sufficiently to permit its removal. When this partial hardening has taken place the attendants operate the screw-threaded shafts 7 through the handles 9, thus raising the end members 4 and forcing the side walls outwardly by means of the pins 6 in the slots 5. The combined lifting and cleaning device is then lowered until the hooks 19 pass under the removable bottom. The lifting device is then operated to raise the block which moves vertically so that its opposite sides are acted on by the brushes 37 and water from the pipes 38. The cleaning devices 20 move upwardly in contact with the side walls of the mold and not only clean and polish them as above stated but act as guides for the block so that its faces will be uniformly presented to the brushes 37 and sprinkler pipes 38. The block is then removed from the lifting device, the mold closed and the above specified operation repeated.

While I have illustrated and described only one structure embodying my invention, I do not desire to be limited thereto.

What I claim is:

1. The combination in an apparatus of the kind described of side walls, means for opening said side walls while maintaining their parallel relation, a depending lifting device, means for vertically moving same, and cleaning devices on the opposite sides of said lifting device adapted to engage the inner faces of said parallel walls, substantially as described.

2. The combination in an apparatus of the kind described of side walls, means for opening said side walls while maintaining their parallel relation, a depending lifting device having lifting hooks at its lower end, means for vertically moving same, and cleaning devices on the opposite sides of said lifting device adapted to engage the inner faces of said parallel walls, substantially as described.

3. The combination in an apparatus of the kind described of side walls, means for opening said side walls while maintaining their parallel relation, a depending lifting device having lifting hooks at its lower end, means for vertically moving same, and combined cleaning and guiding devices on the opposite sides of said lifting device adapted to engage the inner faces of said parallel walls, substantially as described.

4. The combination in an apparatus of the kind described of parallel side walls, a removable bottom having oppositely disposed depending flanges, a lifting device having oppositely disposed depending hooks adapted to engage said flanges, and combined cleaning and guiding devices secured thereto adapted to engage said side walls and guide said hooks into operative position, substantially as described.

5. The combination in an apparatus of the kind described of oppositely disposed parallel side walls, a vertically movable frame, cleaning devices on the opposite sides of said frame adapted to engage said side walls, and means for raising and lowering said frame, substantially as described.

6. The combination in an apparatus of the kind described of oppositely disposed vertical side walls, a depending lifting device, means for vertically moving the same, and combined guiding and cleaning devices on the opposite sides of same adapted to engage said side walls, substantially as described.

7. The combination in an apparatus of the kind described of a mold box having side walls adapted to move outwardly while maintaining parallel relation, a lifting device adapted to be lowered in said box, means for raising said lifting device, mold cleaning members on said lifting device adapted to engage and clean said side walls when the device and block are raised, block cleaning members mounted at the upper sides of said side walls and adapted to engage and clean the block as it is raised, the cleaning members on said lifting device being arranged to act as guides and to cause the block to move in uniform contact with said block cleaning members, substantially as described.

8. The combination in an apparatus of the kind described of a mold box, comprising vertical side walls and a removable bottom with a lifting device attached to raise vertically said removable bottom and the block cast thereon, cleaning devices adapted to engage said block while being raised and sprinkler pipes extending along the upper edges of said side walls, for the purpose described.

GROSVENOR ATTERBURY.

Witnesses:
WILLIAM WILSON,
JOSEPH P. MARSHALL.

---

Copies of this patent may be obtained for five cents each, by addressing the "Commissioner of Patents. Washington, D. C."